M. H. MOFFETT.
DRY BATTERY.
APPLICATION FILED JUNE 9, 1915.
1,196,381.
Patented Aug. 29, 1916.
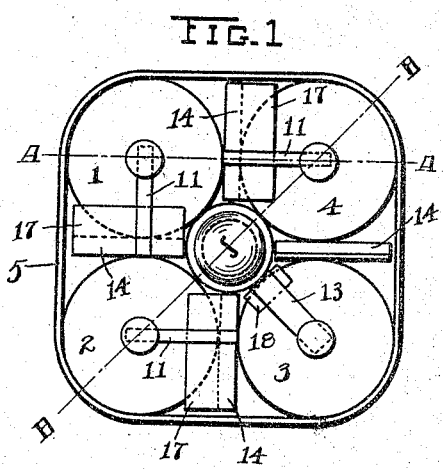
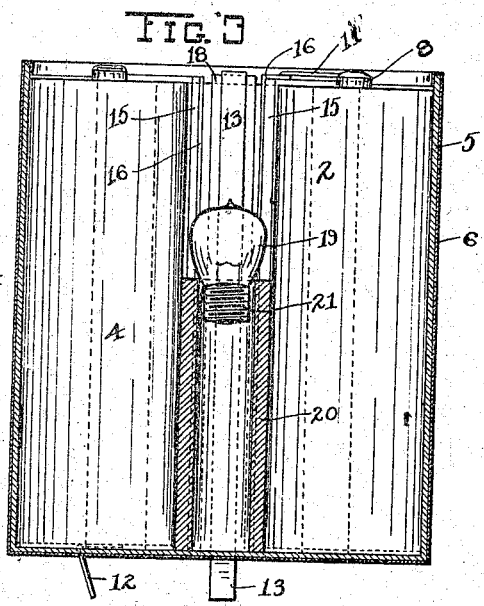
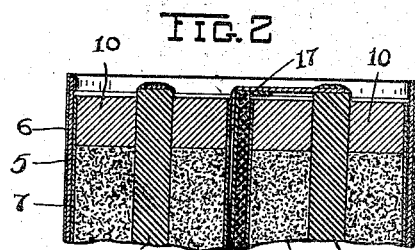
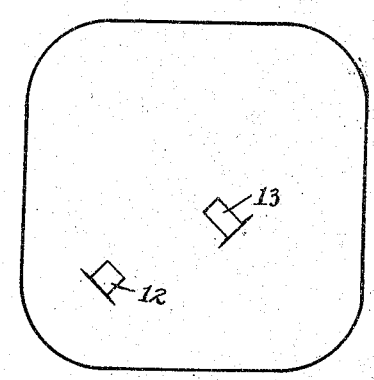
WITNESS
H. G. Grover
INVENTOR.
MARCUS H. MOFFETT
BY
Ira J. Adams
ATTORNEY

UNITED STATES PATENT OFFICE.

MARCUS H. MOFFETT, OF LAKEWOOD, OHIO, ASSIGNOR TO NATIONAL CARBON COMPANY, A CORPORATION OF NEW JERSEY.

DRY BATTERY.

1,196,381.  Specification of Letters Patent.  Patented Aug. 29, 1916.

Application filed June 9, 1915. Serial No. 33,045.

*To all whom it may concern:*

Be it known that I, MARCUS H. MOFFETT, a citizen of the United States, residing at Lakewood, in the county of Cuyahoga and State of Ohio, have invented a certain new and useful Improvement in Dry Batteries, of which the following is a full, clear, and exact description.

This invention relates to an improvement in electric batteries and more particularly to a dry battery casing for use in electric battery lamps.

One object of my invention is to provide a compact and simple arrangement of a plurality of dry cells to form a battery suitable for use in a hand lantern.

A further aspect of this invention consists in an arrangement for preventing the electrolyte from reaching the metallic parts of the lantern.

Another object of my invention is the combination with a battery having the aforementioned features, of a space for storing a lamp bulb.

The invention is illustrated in the accompanying drawings in which:—

Figure 1 is a top plan view. Fig. 2 is a cross section on the line A—A of Fig. 1. Fig. 3 is a view partially in cross section on the line B—B of Fig. 1. Fig. 4 is a bottom view. Fig. 5 is a partial cross sectional view through the center of a modification.

As shown in Fig. 1 the battery consists of a plurality of dry cells, 1, 2, 3 and 4, four being shown only by way of example, inclosed in a cardboard casing 5 finished with a surface material 6. The cells are the well known type consisting of cylindrical zinc containers 7, central carbon electrodes 8, a mix 9 therebetween containing electrolyte, and a seal 10 at the top. The cells may be provided with jackets which may also be waterproofed if desired. Each of the cells 1, 2 and 3 have metallic strips 11 soldered or otherwise fastened to the zinc container. A strip 12, which serves as a terminal, is soldered to the bottom of the zinc container of the cell 4, and brought out through a slit in the bottom of the casing. The second terminal consists of a flat strip 13 soldered to the carbon electrode of the cell 3 and also brought out at the bottom through a slit. To properly insulate the cells, insulating members 14 are inserted between the adjacent surfaces of the cells. In the preferred form these members consist of waterproofed cardboard built up of a heavy layer 15 and a flexible layer 16 adjacent the zinc container. A small piece 17 of the flexible paper is bent over the edge of the heavy layer and the connecting strip 11 is then bent over the strip 17 and soldered to the carbon electrode of the adjacent cell. The terminal 13 is bent over an insulating strip 18 in a similar manner. A battery of this type may be inserted in a metallic lantern having an incandescent lamp in the bottom and contacts adapted to coöperate with the terminals of the battery to complete the circuit. Such a battery lamp is intended primarily as a railway switchman's lantern and in this service must stand considerable rough usage, and consequently the incandescent lamp is often broken. A space for storing a renewal lamp 19 is provided in the battery by the central opening formed between the cells. A paper tube 20 is fitted in the lower half of the opening, and this may receive the base 21 of the lamp 19.

Dry cells when used in battery lamps are subjected to a very heavy current drain which in many cases causes the electrolyte to bubble or be forced through a hole in the seal provided for the escape of gas. The electrolyte often foams or bubbles over the top of the seal and the edge of the casing, and in this manner will come in contact with and corrode the metallic parts of the lantern. To eliminate these disadvantages I carry the edge of the case above the top of the zinc container. This will prevent the electrolyte from running over, and thus to a large extent will prevent bubbles from reaching the metal parts of the lantern.

An improved modification, which very effectively prevents bubbles from reaching the metal, is shown in Fig. 5, in which the cardboard casing, instead of being open, is provided with a top 22. When the electrolyte foams out of the cells it cannot reach the lantern and hence it will last indefinitely. An absorbent material could also be packed between the batteries and the top of the casing, but an air-space is preferable. In this modification an incandescent lamp is inserted in the central space in the same manner as previously described, and for this purpose an opening 23 is cut in the top, for inserting the lamp.

Having described my invention, what I claim is:—

1. In electric batteries, a battery case having a bottom member, a plurality of cells therein in an upright position, terminals extending through the bottom of the case, a cover for the top of the case and an air space between the top of the cells and said cover.

2. In electric batteries, a battery case having a bottom member, a plurality of cells therein in an upright position, terminals extending through the bottom of the case, said case having side walls extending above the top of the cells to prevent exuded electrolyte from escaping over the edge of the cells.

3. In electric batteries, a battery case having a bottom member, a plurality of cells therein, terminals extending through the bottom of the case, a cover for the top of the case having a central hole and an extra chamber beneath the hole to store a lamp.

4. In electric batteries, a battery case having a bottom member, a plurality of cells therein having a central chamber therebetween to store an extra lamp, a tubular member in the lower part of said chamber adapted to receive the base of the lamp, terminals extending through the bottom of the case, and a cover for the top of the case having a central hole above said cavity for inserting the lamp.

In testimony whereof, I hereunto affix my signature.

MARCUS H. MOFFETT.